(12) United States Patent
Simon (10) Patent No.: US 10,940,455 B2
(45) Date of Patent: Mar. 9, 2021

(54) GAS INJECTION ELEMENT FOR A FLUID CATALYTIC CRACKING UNIT AND GAS DISTRIBUTION SYSTEM EQUIPPED WITH THIS INJECTION ELEMENT

(71) Applicant: Total Raffinage Chimie, Courbevoie (FR)

(72) Inventor: Hubert Simon, Le Havre (FR)

(73) Assignee: Total Raffinage Chimie, Courbevoie (FR)

( * ) Notice: Subject to any disclaimer, the term of this patent is extended or adjusted under 35 U.S.C. 154(b) by 0 days.

(21) Appl. No.: 16/619,557

(22) PCT Filed: Jun. 11, 2018

(86) PCT No.: PCT/EP2018/065267
§ 371 (c)(1),
(2) Date: Dec. 5, 2019

(87) PCT Pub. No.: WO2018/228964
PCT Pub. Date: Dec. 20, 2018

(65) Prior Publication Data
US 2020/0129945 A1    Apr. 30, 2020

(30) Foreign Application Priority Data
Jun. 12, 2017   (FR) ...................................... 1755223

(51) Int. Cl.
*B01J 8/18*    (2006.01)
*B01J 8/44*    (2006.01)
(Continued)

(52) U.S. Cl.
CPC ............. *B01J 8/1818* (2013.01); *B01J 4/001* (2013.01); *B01J 8/44* (2013.01); *C10G 11/18* (2013.01); *B01J 2208/00938* (2013.01)

(58) Field of Classification Search
CPC ... B01J 8/1818; B01J 8/44; B01J 4/001; B01J 4/002; B01J 2208/00902; B01J 2208/00938; C10G 11/18
See application file for complete search history.

(56) References Cited

U.S. PATENT DOCUMENTS

| 4,429,471 A | * | 2/1984 | Goodstine | ............... F26B 3/082 |
| | | | | 239/557 |
| 5,806,206 A | | 9/1998 | Christian | |
| 2014/0112832 A1 | * | 4/2014 | Lacy | ..................... B01J 8/1827 |
| | | | | 422/139 |

FOREIGN PATENT DOCUMENTS

| FR | 3024050 A1 | 1/2016 |
| WO | 0012206 A1 | 3/2000 |

OTHER PUBLICATIONS

International Search Report issued in Application No. PCT/EP2018/065267, dated Jul. 19, 2018, 5 pages.

* cited by examiner

*Primary Examiner* — Lessanework Seifu
(74) *Attorney, Agent, or Firm* — Albert Shung

(57) ABSTRACT

The invention relates to a gas injection element (10) for a system for distributing as gas inside a chamber of a fluid catalytic cracking unit. This injection element comprises a passage (14) passing right through it in a longitudinal direction (X), and —a metallic internal element (20) of which an internal surface (22) defines part of the through-passage (14) passing through in a longitudinal direction (X), —a hollow metal sleeve (30) accepting one end (20a) of the internal element (20) and attached thereto, —a hollow metal support (40) having an internal surface (42) defining the remainder of the through-passage passing through in the longitudinal direction (X), the said sleeve also being attached to one end of the support (40).

13 Claims, 4 Drawing Sheets

(51) Int. Cl.
*B01J 4/00* (2006.01)
*C10G 11/18* (2006.01)

GAS INJECTION ELEMENT FOR A FLUID CATALYTIC CRACKING UNIT AND GAS DISTRIBUTION SYSTEM EQUIPPED WITH THIS INJECTION ELEMENT

CROSS-REFERENCE TO RELATED APPLICATIONS

This application claims the benefit of PCT/EP2018/065267 filed Jun. 11, 2018, which claims priority from FR 1755223 filed Jun. 12, 2017, which are incorporated herein by reference in their entireties for all purposes.

The invention relates to the injection of gas, in particular to the injection of air, optionally enriched with $O_2$, or of steam in a Fluid Catalytic Cracking (FCC) unit. The invention thus relates to a gas injection element and to a gas distribution system equipped with one or more gas injection elements.

In an FCC unit, the air injection systems (air grid, air ring, "pipe grid" of the regenerator) or steam injection systems (in particular for the stripping operations) are generally equipped with injection nozzles making it possible to control the distribution of the flow of gas and the ejection speed. Injections of air or of steam generally occur with high ejection speeds that generate very fast recirculations of particles in a fairly dense catalyst environment (fine particles extremely rich in alumina abrasive). Lapping erosion by the catalyst is thus observed on the faces of these injection nozzles directly and indirectly exposed to the catalyst circulating in the unit, and in particular through the Venturi effect at the output of these injection nozzles. This erosion mechanism appears to be particularly destructive. Another erosion mechanism is also observed. In fact, the catalyst enters inside the nozzles, either through a phenomenon called "vena contracta", by the catalyst being drawn in by the Venturi effect of the jet of fluid exiting the nozzle, or following weeping of the catalyst inside the nozzle, for example, in the case of operation at a low flow rate. The catalyst that has entered the injection nozzle is expelled therefrom by the jet of fluid, causing erosion of the nozzle.

In order to limit these erosion phenomena, several solutions have been contemplated. One solution involves, for example, making the nozzles entirely from ceramic. However, such nozzles are fragile. Another solution involves producing a nozzle made of metal covered with a layer of hard material, for example, Stelae®. Such nozzles exhibit good erosion resistance, but ultimately have to be replaced. Yet another solution involves producing nozzles made of several parts: an external fixing part, generally made of stainless steel, intended to be fixed on the air injection system and receiving an internal part made of hard material, for example, Stelae®. However, such nozzles must be entirely replaced in the event of damage.

Thus, the maintenance of these distribution systems often requires the periodic replacement of a significant number of nozzles during each shut-down. Furthermore, nozzle replacement is relatively long, with the nozzles having to be unsoldered one at a time, with the soldering zone possibly being located under a protective coating that firstly has to be removed. Furthermore, on a regular basis, the number of nozzles that will need to be replaced is such that replacement of the complete distribution system is often anticipated in order to shorten the maintenance work and the period of unavailability of the unit.

A requirement therefore exists for limiting and reducing the maintenance of gas injection systems subjected to various erosive processes.

To this end, the subject matter of the invention relates to a gas injection element for a system for distributing gas inside a chamber of a fluid catalytic cracking unit, said injection element comprising a passage passing through said element from one end to the other and extending in a longitudinal direction characterized in that it comprises:
an internal metal element, an internal surface of which defines part of the through-passage in the longitudinal direction;
a hollow metal sleeve, receiving an end of the internal element and fixed thereto;
a hollow metal support having an internal surface defining the rest of the through-passage in the longitudinal direction, said sleeve also being fixed to an end of the support.

The internal metal element of the injection element particularly forms a nozzle.

The arrangement of the injection element of the invention has numerous advantages. It is particularly possible to produce an internal metal element (forming a nozzle) that is specific to each use, without modifying the support, or even the sleeve. It is also possible to easily and economically produce large quantities of the internal metal element and its sleeve. Finally, the internal metal element and sleeve assembly can be quickly and easily assembled on the support or disassembled therefrom.

Advantageously, the sleeve can be in abutment against the end of the support to which it is fixed in said longitudinal direction. In other words, the sleeve is mounted in abutment against the support in the longitudinal direction. This can facilitate its assembly on the support.

Furthermore, a predetermined clearance can be provided between an end of the proximal internal element of the support and said support in said longitudinal direction. This can limit the introduction of additional and uncontrolled mechanical stresses, in particular in the vicinity of a soldering zone between the sleeve and the internal element, when said solder is present.

The gas injection element can comprise at least one of the following features:
the sleeve is shrunk-fit on the internal element;
the sleeve is soldered to the internal element;
the sleeve is soldered to the support.

The sleeve thus can be solely shrunk-fit on the internal element.

When the sleeve is soldered to the internal element, this solder can be used to secure these parts, to provide a gas seal, or both.

In particular, the sleeve can be both shrunk-fit on the internal element and soldered thereto, for better retention of the internal element and/or a better seal.

Depending on the applications, the support, the sleeve and the internal element can be produced with identical or similar materials, each preferably being produced from one part. However, when one of the parts of the injection element is likely to experience harsher conditions, it can be preferable for different materials to be provided for at least one part of the elements or for all the elements.

Advantageously, the support and the sleeve can be formed from the same metal material. This can facilitate their fixing using soldering and avoid increasing the complexity of the "on-site" replacement operations during maintenance. This metal material particularly can be selected from iron-based alloys, in particular high temperature resistant stainless steels.

The material forming the internal element advantageously can be different from the material forming the support and/or the sleeve. This metal material particularly can be selected from cobalt-based alloys, in particular high temperature resistant alloys.

Producing the gas injection element in several parts allows each part to be modified independently of one another, as long as they can be assembled, thus reducing the manufacturing costs and the maintenance costs during minor modifications.

Thus, an end of the support opposite the internal element can have an opening, the transverse section of which has a surface area that is less than or equal to the surface area of the transverse section of the part of the passage defined by the support. In particular, the dimensions of this opening can be selected in accordance with the dimensions of the end of the passage located on the side of the internal element. It is thus possible to select the dimensions of the opening in accordance with the desired hydrodynamic properties for the gas injection element. Control of the jet effects also could be desired. This configuration thus allows geometric shapes to be introduced that are complex (which can be obtained simply by precision molding or precision casting) and are specifically designed to combat the effects of erosion (actions on the shapes, speeds and jet effects at the ejection of the nozzles). The theoretical results particularly can be easily verified by introducing a few comparative test nozzles into the injection system.

The end of the support fixed to the sleeve can form a collar projecting from the support in a direction transverse to the longitudinal direction. This can facilitate the assembly of the injection element on the gas distribution system for which it is intended.

In particular, the collar can define a housing receiving the sleeve over part of its length in the longitudinal direction, which can facilitate the assembly of the sleeve on the support. Preferably, the shape of the housing matches that of the sleeve. It is to be noted that the end of the support fixed to the sleeve can define a housing as previously described, even without a collar.

By way of a variant or in combination, the size of the collar, in the longitudinal direction, can be predetermined. This height can, for example, correspond to the height of a protective coating intended to cover a face of a gas distribution system receiving the injection element. Thus, fixing and disassociating the sleeve and the internal element can be carried out without having to remove the coating.

In general, it can be preferable for the transverse section of the through-passage not to exhibit any sharp variations between the support and the internal element. A progressive development thus optionally can be sought.

In one embodiment, the injection element can comprise a through-passage with a constant section over its entire length in the longitudinal direction.

Nevertheless, other shapes of through-passage can be provided.

Thus, the through-passage of the injection element can comprise a divergent part flaring out toward the end of the internal element remote from the support in the longitudinal direction.

The rest of the through-passage then can have a section with a constant shape and a surface area identical to the shape and to the surface area of the transverse section with a smaller surface area than the divergent part.

Advantageously, the divergent part can correspond to the part of the through-passage defined by the internal element, which can allow its production to be facilitated.

By way of a variant, the through-passage can be divergent over its entire length.

It is also possible to produce internal elements having particular shapes at the end thereof that is opposite the support.

Thus, an edge of the internal element opposite the support can have a transverse section, the contour of which comprises at least three segments selected from a straight segment and a curved segment. This edge can particularly define a flange transversely projecting from the external surface of the internal element.

In order to facilitate manufacturing, the sleeve can be a rotational body, in particular a cylinder, having an axis of rotation coincident with or parallel to a longitudinal axis of the through-passage, with at least one part of an external surface of the internal element fixed to the sleeve then assuming a shape that matches the sleeve. The internal element also can be a rotational or non-rotational body. It particularly can have an external rotational surface and an internal surface that is not a rotational surface.

Advantageously, the support also can be a rotational body, in particular having one or more cylindrical parts.

The invention also relates to a system for distributing gas inside a chamber of a fluid catalytic cracking unit, said distribution system comprising at least one support wall perforated with at least one orifice and defining at least part of a cavity, the support wall having a first face intended to be in contact with a gas contained in this cavity, and a second face opposite the first face.

By way of an example, this support wall can be a grid, a perforated plate or can define a tube, in particular a curved tube closed upon itself in the manner of a torus or even can define a plurality of tubes that criss-cross one another (a "pipe grid" or air grid).

According to the invention, the distribution system comprises at least one injection element as previously described, the injection element being secured to the support wall, at the level of the orifice, so that gas emanating from the cavity can circulate through the support wall toward the second face thereof via the passage of the internal element and of the support.

Advantageously, the support can be inserted into the orifice and secured to the support wall, with the internal element projecting from the second face of said support wall.

By way of a variant or in combination, the support, when it has a collar, can be positioned so that the collar is located on the side of the second face of said support wall.

It is to be noted that the dimensions of the collar can be selected so as to be flush with a protective coating located on the side of the second face, with this protective coating being the same height as the collar in a direction perpendicular to the support wall.

The invention will now be described with reference to the accompanying, non-limiting drawings, in which.

Figures 1, 2, 2A, 2B:
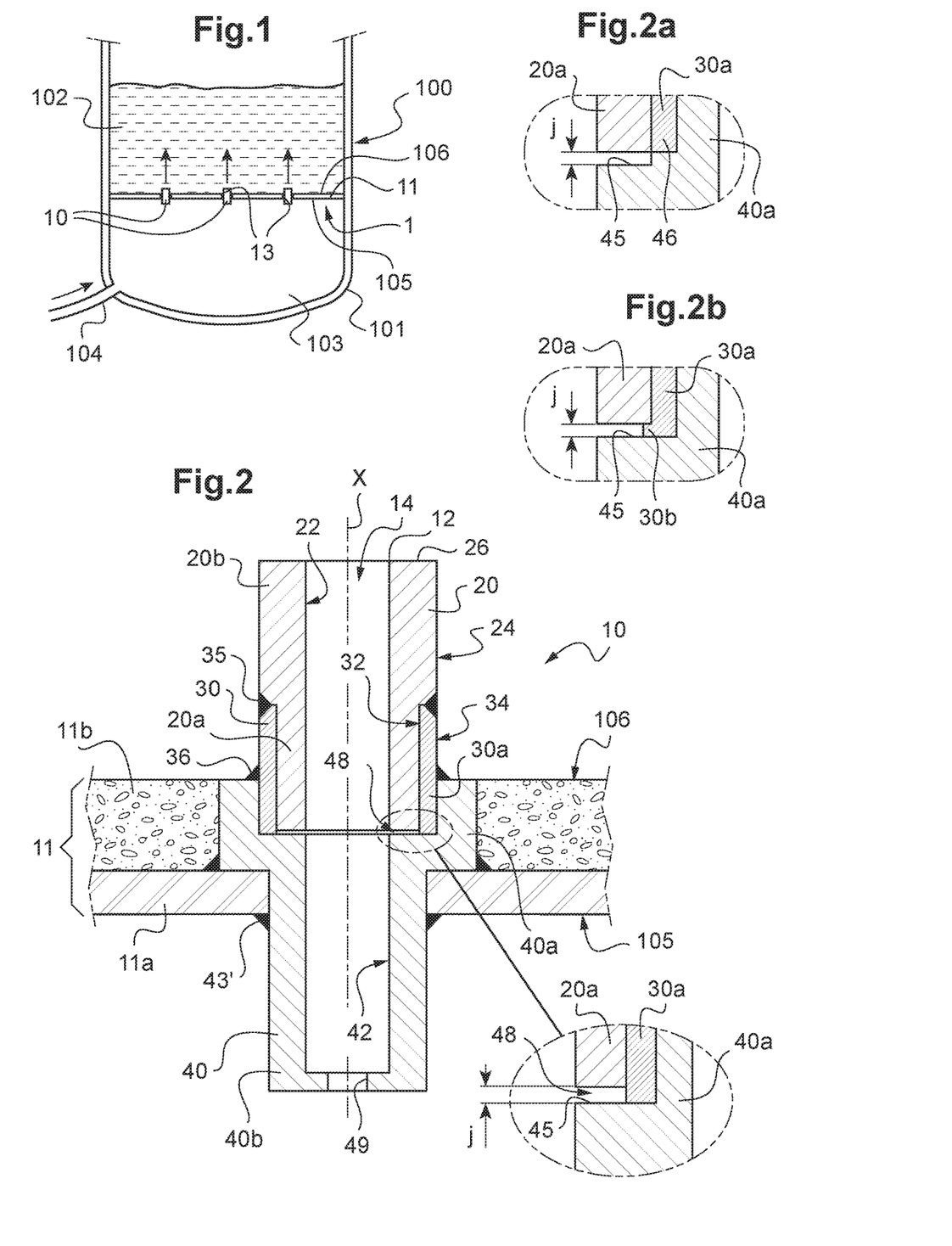
FIG. 1 illustrates a schematic section view representation of a chamber comprising a gas distribution system according to one embodiment.
FIG. 2 illustrates a schematic partial longitudinal section view representation of an injection element according to one embodiment.
FIGS. 2a, 2b illustrate, as a longitudinal section view, various embodiments of the junction between the support and the internal element of the injection element of FIG. 2.

FIG. 1 partially represents a chamber 100 forming part of a Fluid Catalytic Cracking (FCC) unit which has not been shown in its entirety. The chamber shown in this case is a chamber of a regenerator, in which coke deposited on the catalyst coming from a reactor of the FCC unit (not shown) undergoes combustion.

The catalyst in the chamber 100 forms a fluidized bed 102.

A distribution system 1 allows air, and thus the oxygen required for the combustion of the coke, to be injected into this fluidized catalytic bed 102.

This distribution system 1 comprises a support wall, in this case a perforated plate 11, occupying the entirety of a section of the chamber 100, and supporting the fluidized bed 102. This plate with the bottom walls of the chamber thus defines an air cavity 103. A pipe 104 opening onto this cavity 103 allows pressurized air to be supplied.

The plate thus comprises a first face 105, in contact with the air of the cavity 103, and a second face 106 in contact with the fluidized catalyst bed 102.

The perforated plate 11 in this case is a substantially flat plate 11a, in particular made of steel. It can have a protective coating 11b, for example, a refractory coating, made of composite material (shown in FIG. 2) on the side of the second face 106. This refractory coating is obtained, for example, by pouring concrete onto a steel latticework, not shown, for example, in the form of a honeycomb comprising a plurality of hexagonal cells joined together along their sides ("hex mesh"), or the like.

A gas injection element 10, in this case an air injection nozzle, is mounted on each orifice 13 of the plate 11.

An embodiment of this injection element 10 is described with reference to FIG. 2. It comprises a passage 14 passing through said element from one end to the other in a longitudinal direction X. In this example, the longitudinal direction X is also an axis of symmetry of the passage 14 and also of the injection element 10. The injection element 10 is secured to the support wall 11 in such a way that gas emanating from the cavity 103 can circulate through the support wall 11 toward the second face 106 thereof via the through-passage 14.

This injection element 10 comprises:
- a metal internal element 20, an internal surface 22 of which defines part of the through-passage 14 in the longitudinal direction;
- a hollow metal sleeve 30, receiving an end 20a of the internal element 20 and fixed thereto;
- a hollow metal support 40 having an internal surface 42 defining the rest of the through-passage 14 in the longitudinal direction X, the sleeve 30 also being fixed to an end 40a of the support 40.

Advantageously, the injection element 10 does not comprise another element, as in the present example.

In the example shown, the sleeve 30 is shrunk-fit on the internal element 20. Furthermore, the sleeve 30 is, on the one hand, soldered to the internal element 20 by a solder 35 and, on the other hand, soldered to the support 40 by a solder 36.

Thus, in the example, the internal element 20 comprises an internal surface 22, which defines the through-passage 14 over part of its length, and an external surface 24. The sleeve 30 comprises an internal surface 32 and an external surface 34.

The internal surface 32 of the sleeve 30 and the external surface 24 of the internal element 20 have, at ends 20a, 30a to be secured, shapes and dimensions that allow them to be secured, in particular by shrink-fitting. In this example, these surfaces are surfaces with matching shapes. It particularly involves rotational surfaces, in this case cylindrical, having an axis of rotation coincident with or parallel to, in this case coincident with, the axis X.

In this example, it will be noted that the internal element 20 comprises different sized cylindrical parts, in this case the sleeve 30 is a simple cylindrical sleeve. These parts thus can be easily manufactured. The invention is not limited to a particular shape for the sleeve and for the internal element, as long as these parts can be fixed at least by soldering or by shrink-fitting, or by means of both techniques. It is particularly understood that producing these parts is easier when it involves rotational bodies.

It will also be noted that the sleeve 30 surrounds the internal element 20 over only part of its length. This can limit erosion of the sleeve 30, with this erosion normally mainly being observed at the ends of the injection elements, in other words, at the free end of the internal element 20.

The fact of having the sleeve 30 over a limited length of the internal element 20 can allow only the element 20 to be exposed to erosion. Its material then can be selected for erosion resistance.

The sleeve 30 forms the link between the erosion resistant material (element 20) and the metal support 40.

It will be noted that the securing implemented between the parts 20 and 30 can prove to be delicate: it can be completed in plant when the injection element is manufactured. Thus, during working periods, the injection elements are replaced by removing the assembly 30+20, by removing the solder 36, then by fitting a new assembly 30+20 by re-soldering. This work is easy and fast.

However, the invention is not limited by a particular length and a particular shape of the sleeve 30 and of the internal element 20, as long as they can be secured to one another. In particular, the sleeve can be the same length as the internal element. However, preferably, the sleeve can be shorter, yet long enough to allow it to be inserted into the housing of the support provided to this end and to allow it to be soldered to the support 40. Furthermore, it is preferable that the solder 36 is not too close to the solder 35, when said solder is present.

Advantageously, as shown, the external surface 24 and the external surface 34 can be in the extension of one another following the securing of the sleeve 30 to the internal element 20 (see FIG. 2). This can allow any wear of the external surface of the "internal element+sleeve" assembly to be limited. Furthermore, such an arrangement is well suited to the production of the solder 35. However, a space can be provided between the two external surfaces, which space is filled by the solder 35 securing the two parts.

The material forming the sleeve 30 can be an iron-based alloy, in particular a stainless steel. The material forming the internal element can be made of a cobalt-based alloy, for example, of Stelae®. The support 40 also can be made of an iron-based alloy, in particular of stainless steel.

Preferably, each part, namely the sleeve 30, the support 40 and the internal element 20, is produced from a part independently of the others.

It will be noted that in the example shown, the sleeve 30, more specifically its end 30a, is in abutment against a surface of the end 40a of the support 40 to which it is fixed, in the longitudinal direction X (see the enlarged zone of FIG. 2). Furthermore, a predetermined clearance j is provided between the end 20a of the proximal internal element 20 of the support 40 and said support in the longitudinal direction X.

As can be seen on the enlarged view of FIG. 2, this clearance j can be obtained by using a sleeve 30, the end 30a of which projects from the internal element 20 toward the support 40. The end 30a is then in abutment against a surface 45 of the end 40a of the support 40.

By way of a variant, this clearance j can be obtained by an adapted shape of the support 40, with a surface 45 thereof extending, for example, perpendicular to the longitudinal direction X and having a shoulder 46 in abutment against the end 30a of the sleeve (see FIG. 2a). Said sleeve then does not project from the internal element 20 in the longitudinal direction X.

Moreover, the end 30a of the sleeve can have a flange 30b extending between the internal element 20 (the end 20a thereof) and the support 40 (the surface 45 thereof) (see FIG. 2b).

It is also possible to contemplate obtaining this clearance by inserting a distinct part (not shown) between the support 40 and the sleeve 30, with said distinct part optionally being able to extend between part of the internal element close to the sleeve and the support.

The support 40 shown in FIG. 2 comprises an end 40a in the form of a collar projecting from the support 40, in particular from its external surface 44, in a direction transverse to the longitudinal direction, in this case in a direction perpendicular to said longitudinal direction. In the present description, reference 40a equally denotes the collar and the end of the support 40 fixed to the sleeve.

In this example, the support 40 is also a rotational body. In this case it is formed by two cylindrical parts with different diameters.

This end 40a in the form of a collar also defines a housing 48 receiving the sleeve 30 over part of its length in the longitudinal direction. This housing 48 in this case receives the end 30a of the sleeve. It will be noted that the shape of the housing 48 matches the end 30a that it has to receive.

It thus can be understood that the aforementioned surface 45 forms the bottom of the housing 48, which thus can have zones with different depths in order to provide the clearance j, as described with reference to FIG. 2a.

The dimension in the longitudinal direction X of the end 40a in the form of a collar in this case corresponds to the height of the refractory coating 11b covering the steel plate 11a. Thus, when the injection element 10 is inserted into an orifice 13, its collar 40a comes into abutment against the plate 11a, on the side of the second face 106 of the gas injection system. The support 40 is then soldered to the plate 11a by a solder 43. The protective coating 11b then can be applied on the plate 11a up to the edge of the collar 40a (see FIG. 2). It is thus possible to solder the sleeve 30 to the support 40 (and respectively unsolder it), despite the presence of the protective coating, thus allowing the assembly/disassembly of the sleeve 30+internal element 20 assembly for "on-site" maintenance operations, whilst leaving the support 40 in place.

By way of a variant or in combination, the support 40 can be soldered to the plate 11a by a solder 43' located on the side of the face 105 of the support wall 11.

In the example shown in FIG. 2, the injection element 10 has a through-passage 14 with a constant transverse section over the entire length of the injection element (in direction X). However, the invention is not limited to this particular shape, with the through-passage being able to have a divergent part, as described hereafter with reference to FIG. 3.

In the example of FIG. 2, the output opening 12 of the injection element 10, located at the end 20b of the internal element (distal end of the support 40) thus has a transverse section identical to the section of the through-passage 14.

It will also be noted that the end 40b of the support 40, opposite the internal element 20, has an opening 49, the transverse section of which has a surface area that is less than or equal to (in this case less than) the surface area of the transverse section of the passage 14 defined by the support 40 and the internal element 20. By way of an example, for circular sections, the diameter of the opening 49 can represent half the diameter of the passage 14 (which corresponds to the diameter of the opening of the output 12 of the injection element 10 opposite the opening 49 in the longitudinal direction X).

The embodiment shown in FIG. 3 will now be described. This embodiment only differs from that shown in FIG. 2 by the shape of the through-passage 14 and of the end 20b of the internal element 20. Similar elements are thus denoted using the same reference signs.

In this embodiment, the part 15 of the through-passage 14 defined by the internal element 20 is divergent from the end 20a of the internal element 20. In this example, the internal surface 22 of the internal element 20 thus has a frustoconical shape, the smallest dimension of which is located on the side of the support 40. It will be noted that the sections of the through-passage 14 located at the ends 20a and 40a, respectively, are identical in order to ensure continuity of the transverse section of the passage 14 in the longitudinal direction.

Figures 3, 4A, 4B, 4C, 4D, 4E, 5:
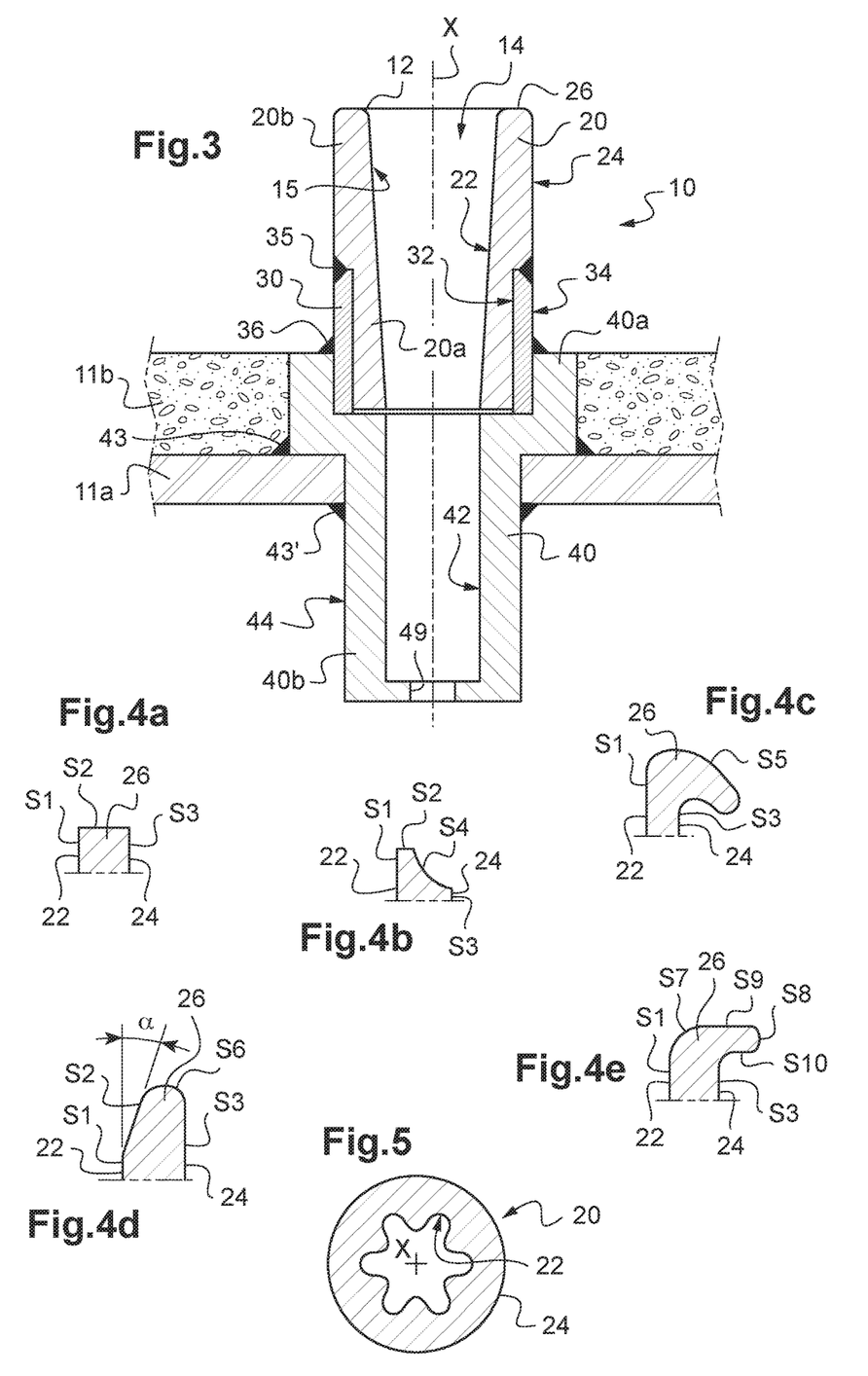
FIG. 3 illustrates a schematic longitudinal section view representation of an injection element according to another embodiment.
FIGS. 4a-4e partially represent, as a longitudinal section view, variants of the edge of the internal element opposite the support.
FIG. 5 represents a transverse section view of an internal element according to a particular embodiment.

The embodiment of FIG. 3 has the advantage of reducing the speed of the gas exiting the injection nozzle. The Venturi effect that sucks in the catalyst and causes erosion on the surface 26 then can be reduced.

Thus, it can be understood that it is possible to modify part of the internal passage without having to modify the whole of the injection element.

It is also possible to easily modify the shape of the output opening 12 of the injection element 10, namely the free edge 26 of the end 20b of the internal element 20.

FIGS. 4a to 4e are longitudinal section views of the free edge 26 of an injection element according to the invention according to different embodiments.

FIG. 4a thus represents an edge 26, the longitudinal section of which has a contour formed by straight segments S1, S2, S3, in particular perpendicular to each other, as in the embodiment shown in FIG. 2. The segments S1 and S3 are thus in the extension of the internal 22 and external 24 surfaces, respectively.

FIG. 4b represents an edge 26, the section of which has a contour comprising three straight segments S1, S2, S3, including two adjacent straight segments S1, S2, in particular perpendicular, and one concave shaped curved segment S4, the concavity of which in this case is directed toward the outside of the injection element 10 and which connects two straight segments S2 and S3. The segments S1 and S3 are in the extension of the internal 22 and external 24 surfaces, respectively. In an alternative embodiment, not shown, the segment S2 could be removed. Furthermore, with or without the segment S2, the curved segment S4 could be convex, with convexity that is directed outward.

FIG. 4c represents an edge 26, the section of which has a contour comprising two straight segments S1 and S3, in the extension of the internal 22 and external 24 surfaces, respectively, connected by a curved segment S5, having convex parts and a concave part, said curved segment S5 defining a generally round shaped flange projecting from the external surface 24 in a substantially transverse direction. This flange has a shape similar to that of a hook.

FIG. 4d represents an edge 26, the section of which has a contour comprising two straight segments S1 and S3, in the extension of the internal 22 and external 24 surfaces, respectively, another straight segment S2 adjacent to the segment S1 and forming an angle α therewith and a curved segment S6 connecting the straight segments S2 and S3. This curved segment S6 has convexity that is directed toward the outside of the injection element.

Finally, FIG. 4e represents an edge 26, the section of which has a contour comprising two straight segments S1 and S3, in the extension of the internal 22 and external surfaces 24, respectively, alternately connected by curved segments S7, S8 and straight segments S9, S10. The curved segments S7, S8 are convex with convexity that is directed toward the outside of the injection element. The edge 26 has a general shape of a round flange projecting from the external surface 24 in a substantially transverse direction. In an alternative embodiment, not shown, the segments S7 and S8 could be straight.

It is thus understood that it is possible to produce edges 26 with various shapes in accordance with requirements.

In the example described with reference to FIG. 3, the support 40 is identical to that described with reference to FIG. 2, as is the sleeve 30. It is thus possible to modify one of the parts of the injection element 10 without having to modify the other parts. Furthermore, the support 40 can remain in position during maintenance, with only the sleeve and the internal element being replaced. When it is present, the collar 40a of the support makes it possible to avoid having to remove a coating that is present around the support.

In the examples described with reference to the figures, the internal surface 22 of the internal element 20 is either frustoconical or conical. The invention is not limited to these shapes. A serrated internal surface 22 can be contemplated, as shown as a transverse section view in FIG. 5, the serrations can be round (as in FIG. 5) or angular. These serrations can extend parallel to the axis X or follow helical lines. The external surface 20 of the internal element 20 for its part remains even. Such a serrated internal surface then can be provided for the support 40 or even the depth of the serrations can decrease from the output 12 up to the end 20a, until it is zero (absence of serrations) at this end 20a.

Finally, it will be noted that the various embodiments described with reference to the figures can be combined.

Figure 6:
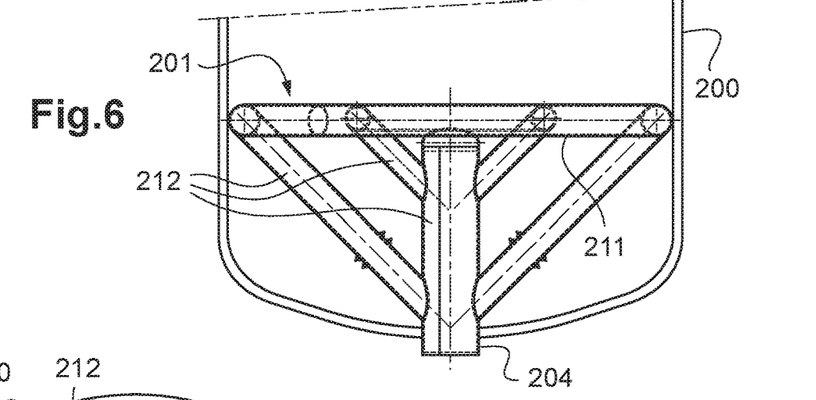
FIG. 6 partially illustrates a schematic section view representation of a chamber comprising a gas distribution system according to another embodiment.
Figure 7:
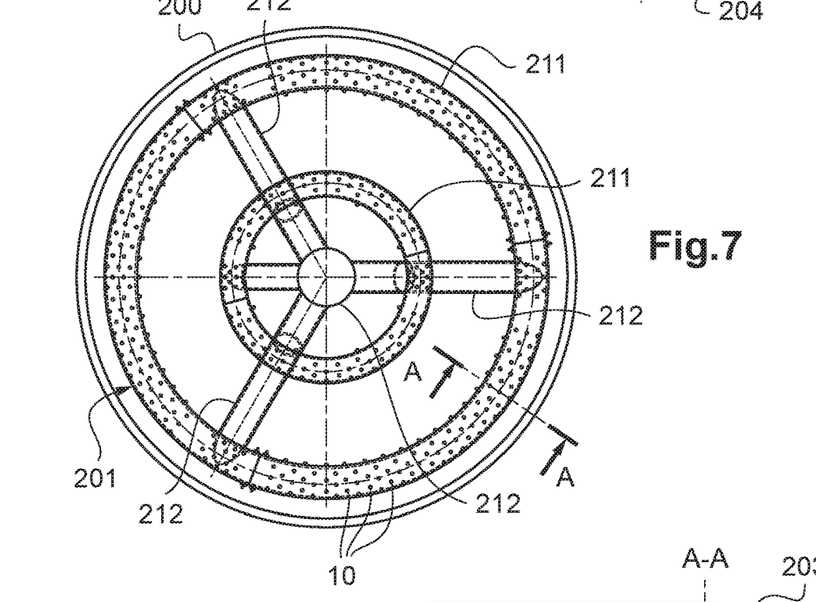
FIG. 7 is a transverse section view of the chamber shown in FIG. 6.
Figure 8:
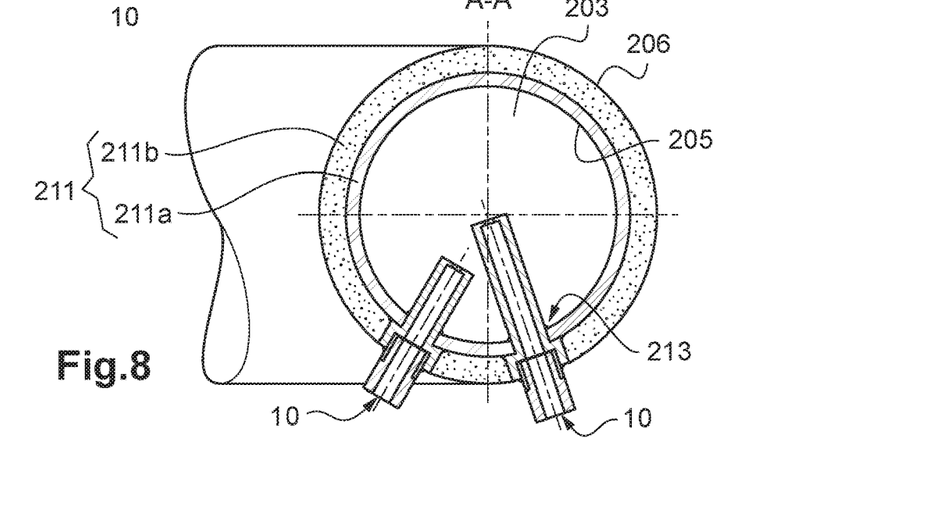
FIG. 8 is a section view along line A-A of FIG. 7.

FIGS. 6 and 7 represent a distribution system 201 comprising two support walls 211. Each support wall 211 is perforated and tubular shaped. In other words, each support wall 211 is a hollow perforated tube defining an internal volume forming an air cavity 203 (FIG. 8) for the purposes of the invention. Furthermore, each support wall 211 in the form of a hollow tube is curved and closed upon itself in the manner of a torus. These support walls 211 are in fluid communication via hollow supply tubes 212. The distribution system 201 is located at the bottom of the chamber 200, with a pipe 204 in fluid communication with the hollow supply tubes 212 and the air cavities 203 supplying pressurized air.

The distribution system 201 is commonly called a "ring" system due to the presence of two hollow tubes 211 in the shape of a ring. However, the invention is not limited to this particular shape, with the distribution system 201 being able to comprise only one distribution ring or more than two rings.

Each support wall 211 comprises a first face 205 in contact with the air of the cavity 203 and a second face 206 in contact with the fluid contained in the chamber 201.

Each support wall 211 in this case is a tube 211a, in particular made of steel. It can have a protective coating 211b, for example, a refractory coating, made of composite material (shown in FIG. 8) on the side of the second face 206. This refractory coating is the same type as that previously described.

A gas injection element 10 is mounted on each orifice 213 of a support wall 211, in this case an air injection nozzle of the type previously described with reference to FIGS. 2-5. It will be noted that nozzles 10 with different dimensions can be provided.

Figure 9:
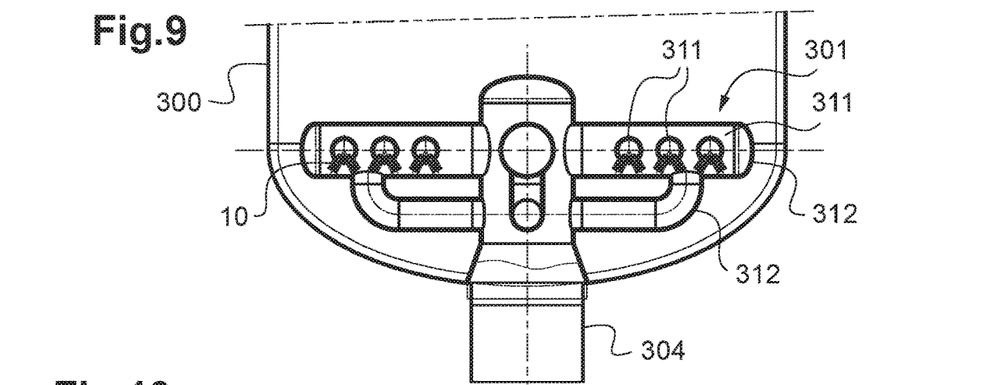
FIG. 9 partially illustrates a schematic section view representation of a chamber comprising a gas distribution system according to another embodiment.
Figure 10:
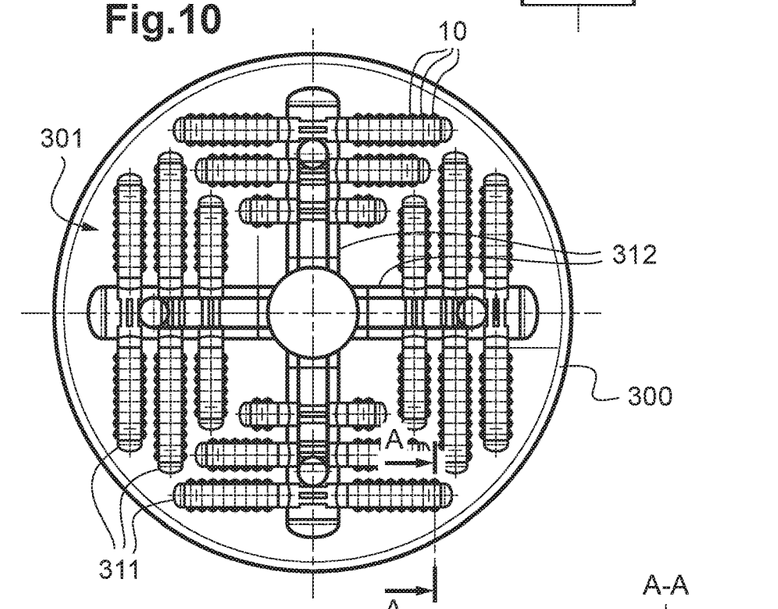
FIG. 10 is a transverse section view of the chamber shown in FIG. 9.

FIGS. 9 and 10 represent a distribution system 301 comprising a plurality of support walls 311. Each support wall 311 is perforated and tubular shaped. In other words, each support wall 311 is a perforated hollow tube defining an internal volume forming an air cavity 303 for the purposes of the invention. The support walls 311 criss-cross one another like a grid (FIG. 10). These support walls 311 are in fluid communication via hollow supply tubes 312. The distribution system 301 is located at the bottom of the chamber 300, with a pipe 304 in fluid communication with the hollow supply tubes 312 and the air cavities 303 supplying pressurized air.

The distribution system 301 is commonly called "pipe grid" or air grid, due to the arrangement of the hollow tubes 311 as a grid extending in the same substantially horizontal plane (FIGS. 9 and 10).

Each support wall 311 comprises a first face 305 in contact with the air of the cavity 303 and a second face 306 in contact with the fluid contained in the chamber 301.

Figure 11:
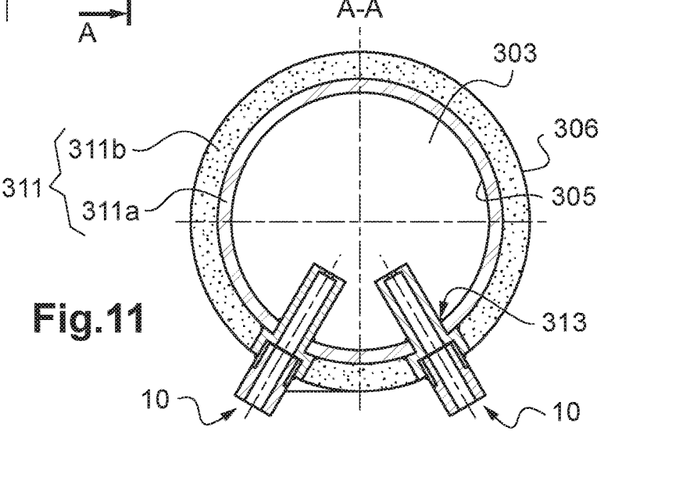
FIG. 11 is a section view along line A-A of FIG. 10.

Each support wall 311 in this case is a tube 311a, in particular made of steel. It can have a protective coating 311b, for example, a refractory coating, made of composite material (shown in FIG. 11) on the side of the second face 306. This refractory coating is the same type as that previously described.

A gas injection element 10 is mounted on each orifice 313 of a support wall 311, in this case an air injection nozzle of the type previously described with reference to FIGS. 2-5.

The gas injection element has been described with reference to an air distribution system in a regenerator of an FCC unit. The invention is not limited to this embodiment, the gas distribution system equally could be a system for distributing steam to a stripping zone of a reactor of an FCC unit or any other gas or steam injection element of an FCC unit.

The invention claimed is:
1. A gas injection element for a system for distributing gas inside a chamber of a fluid catalytic cracking unit, the injection element comprising a passage passing through the element from one end to the other and extending in a longitudinal direction (X), the gas injection element comprising:
an internal metal element, an internal surface of which defines part of the through-passage in the longitudinal direction (X);
a hollow metal sleeve, receiving an end of the internal element and fixed thereto;
a hollow metal support having an internal surface defining the rest of the through-passage in the longitudinal direction (X), the sleeve also being fixed to an end of the hollow metal support, wherein the hollow metal support comprises a collar, wherein the collar is configured to be located on the side of a second face of a support wall of the system for distributing gas,
wherein the system comprises at least one support wall perforated with at least one orifice and defining at least part of a cavity, the support wall having a first face intended to be in contact with a gas contained in this cavity, and the second face opposite the first face.

2. The gas injection element of claim 1, wherein the sleeve is in abutment against the end of the hollow metal support to which it is fixed in the longitudinal direction (X).

3. The gas injection element of claim 2, wherein a predetermined clearance is provided between an end of a proximal internal element of the hollow metal support and the hollow metal support in the longitudinal direction (X).

4. The gas injection element of claim 1, further comprising at least one of the following features:
the sleeve is shrunk-fit on the internal element;
the sleeve is soldered to the internal element;
the sleeve is soldered to the hollow metal support.

5. The gas injection element of claim 1, wherein the metal material forming the internal element is different from the metal material forming the sleeve and/or the metal material forming the hollow metal support.

6. The gas injection element of claim 1, wherein an end of the support opposite the internal element has an opening, the transverse section of which has a surface area that is less than or equal to the surface area of the transverse section of the part of the passage defined by the hollow metal support.

7. The gas injection element of claim 1, wherein the end of the hollow metal support fixed to the sleeve forms a collar projecting from the hollow metal support in a direction transverse to the longitudinal direction (X).

8. The gas injection element of claim 1, wherein the collar comprises at least one of the following features:
the collar defines a housing receiving the sleeve over part of its length in the longitudinal direction (X);
the size of the collar in the longitudinal direction (X) is predetermined.

9. The gas injection element of claim 1, characterized in that the through-passage comprises a divergent part flaring out toward the end of the internal element remote from the hollow metal support in the longitudinal direction (X).

10. The gas injection element of claim 1, characterized in that an edge of the internal element opposite the hollow metal support has a transverse section, the contour of which comprises at least three segments selected from a straight segment and a curved segment.

11. The gas injection element of claim 1, characterized in that the sleeve is a rotational body, in particular a cylinder, having an axis of rotation coincident with or parallel to a longitudinal axis (X) of the through-passage, with at least part of an external surface of the internal element fixed to the sleeve assuming a shape that matches the sleeve.

12. A system for distributing gas inside a chamber of a fluid catalytic cracking unit, comprising at least one gas injection element according to claim 1, the hollow metal support of the injection element being secured to the support wall, at the level of the orifice, so that gas emanating from the cavity can circulate through the support wall toward the second face thereof via the passage of the internal element and of the hollow metal support.

13. The system of claim 12, wherein the hollow metal support is inserted into the orifice and secured to the support wall, the internal element projecting from the second face of the support wall.

* * * * *